US012608359B1

(12) United States Patent
Shveidel et al.

(10) Patent No.: US 12,608,359 B1
(45) Date of Patent: Apr. 21, 2026

(54) DYNAMIC BLOOM FILTER ADJUSTMENT FOR STORAGE SYSTEMS IMPLEMENTING A LOG STRUCTURED MERGE TREE ARCHITECTURE

(71) Applicant: Dell Products L.P., Round Rock, TX (US)

(72) Inventors: Vladimir Shveidel, Pardes-Hana (IL); Sabina Rachev, Herzliya (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/014,773

(22) Filed: Jan. 9, 2025

(51) Int. Cl.
| | |
|---|---|
| *G06F 16/22* | (2019.01) |
| *G06F 3/06* | (2006.01) |
| *G06F 12/0893* | (2016.01) |

(52) U.S. Cl.
CPC ........ *G06F 16/2246* (2019.01); *G06F 3/0604* (2013.01); *G06F 3/0653* (2013.01); *G06F 3/067* (2013.01); *G06F 12/0893* (2013.01)

(58) Field of Classification Search
CPC .. G06F 16/2246; G06F 3/0604; G06F 3/0653; G06F 3/067; G06F 12/0893
See application file for complete search history.

(56) References Cited

U.S. PATENT DOCUMENTS

| | | | | | |
|---|---|---|---|---|---|
| 6,134,551 | A | * | 10/2000 | Aucsmith ............. | H04L 9/3236 |
| 6,952,664 | B1 | * | 10/2005 | Lahiri ..................... | G06F 30/33 |
| | | | | | 703/21 |

| | | | | | |
|---|---|---|---|---|---|
| 8,190,593 | B1 | * | 5/2012 | Dean ..................... | G06F 16/951 |
| | | | | | 707/707 |
| 10,013,574 | B2 | * | 7/2018 | Hore ........................ | G06F 16/22 |
| 10,193,844 | B1 | * | 1/2019 | Conley ................. | H04L 51/214 |
| 10,366,059 | B2 | * | 7/2019 | Shi .......................... | G06F 16/23 |
| 10,366,094 | B2 | * | 7/2019 | Albrecht .............. | G06F 16/248 |
| 10,642,994 | B1 | * | 5/2020 | Allen ................. | H04L 63/0428 |
| 10,650,003 | B1 | * | 5/2020 | Rubin .............. | G06F 16/24573 |
| 10,678,791 | B2 | * | 6/2020 | Chavan ............ | G06F 16/24544 |

(Continued)

OTHER PUBLICATIONS

Dayan et al., "Optimal Bloom Filters and Adaptive Merging for LSM-Trees" (Year: 2018).*

(Continued)

*Primary Examiner* — Charles Rones
*Assistant Examiner* — Huen Wong
(74) *Attorney, Agent, or Firm* — Ryan, Mason & Lewis, LLP

(57) ABSTRACT

An apparatus includes at least one processing device configured to monitor input-output operations for a storage system, the storage system including a memory maintaining a log structured merge tree cache for a log structured merge tree and one or more bloom filters, each of the one or more bloom filters being associated with one or more segments of the log structured merge tree. The at least one processing device is also configured to determine, based at least in part on the monitored input-output operations, whether one or more bloom filter size adaptation trigger conditions have been met. The at least one processing device is further configured, responsive to determining that at least one of the one or more bloom filter size adaptation trigger conditions has been met, to adjust one or more parameters controlling a size of at least one of the one or more bloom filters.

20 Claims, 7 Drawing Sheets

(56) References Cited

U.S. PATENT DOCUMENTS

| | | | | |
|---|---|---|---|---|
| 10,769,126 | B1* | 9/2020 | Hagerup | G06F 16/2453 |
| 11,074,196 | B1* | 7/2021 | Aleti | G06F 12/0866 |
| 11,334,543 | B1* | 5/2022 | Anwar | G06F 16/2228 |
| 2003/0084372 | A1* | 5/2003 | Mock | G06F 11/1471 |
| | | | | 714/E11.13 |
| 2007/0113031 | A1* | 5/2007 | Brown | G06F 12/123 |
| | | | | 711/160 |
| 2011/0040810 | A1* | 2/2011 | Kaplan | G06F 16/11 |
| | | | | 707/822 |
| 2012/0310960 | A1* | 12/2012 | Watanabe | G06F 16/901 |
| | | | | 707/E17.069 |
| 2013/0046974 | A1* | 2/2013 | Kamara | G06F 21/6218 |
| | | | | 713/165 |
| 2013/0166557 | A1* | 6/2013 | Fricke | G06F 16/278 |
| | | | | 707/E17.089 |
| 2013/0227112 | A1* | 8/2013 | Lehmann | G06F 16/9574 |
| | | | | 709/224 |
| 2013/0318051 | A1* | 11/2013 | Kumar | G06F 16/137 |
| | | | | 707/692 |
| 2014/0244779 | A1* | 8/2014 | Roitshtein | H04L 61/103 |
| | | | | 709/213 |
| 2016/0063021 | A1* | 3/2016 | Morgan | G06F 16/182 |
| | | | | 707/754 |
| 2016/0306923 | A1* | 10/2016 | van Rooyen | G16B 30/20 |
| 2017/0090817 | A1* | 3/2017 | Cho | G06F 7/24 |
| 2017/0212894 | A1* | 7/2017 | Feng | G06F 16/29 |
| 2017/0300490 | A1* | 10/2017 | Kachemir | G06F 7/24 |
| 2018/0322401 | A1* | 11/2018 | Wongkar | G06Q 30/0269 |
| 2018/0332100 | A1* | 11/2018 | Bhaskar | H04L 67/566 |
| 2019/0280882 | A1* | 9/2019 | Kodera | G06F 21/33 |
| 2019/0294517 | A1* | 9/2019 | Cazarez Aguilar | |
| | | | | G06F 11/2273 |
| 2019/0324826 | A1* | 10/2019 | Abuelata | G06F 3/048 |
| 2019/0327272 | A1* | 10/2019 | Narayanaswamy | H04L 63/104 |
| 2019/0332701 | A1* | 10/2019 | Rutherglen | G06F 16/245 |
| 2020/0057782 | A1* | 2/2020 | Idreos | G06F 16/2246 |
| 2020/0104310 | A1* | 4/2020 | Dageville | G06F 16/245 |
| 2020/0142830 | A1* | 5/2020 | Natanzon | G06F 12/0862 |
| 2020/0250148 | A1* | 8/2020 | Dayan | G06F 7/14 |
| 2021/0034674 | A1* | 2/2021 | Palsetia | G06F 16/9017 |
| 2021/0168165 | A1* | 6/2021 | Alsaeed | G06N 20/00 |
| 2022/0129532 | A1* | 4/2022 | Douglas | G06V 40/70 |
| 2022/0156231 | A1* | 5/2022 | Wang | G06F 16/9027 |
| 2022/0253222 | A1* | 8/2022 | Liu | G06F 3/064 |
| 2023/0152967 | A1* | 5/2023 | Min | G06F 3/0638 |
| | | | | 710/5 |
| 2023/0229651 | A1* | 7/2023 | Dayan | G06F 16/2358 |
| | | | | 707/797 |
| 2023/0281049 | A1* | 9/2023 | Dong | G06F 3/065 |
| | | | | 718/104 |
| 2025/0021539 | A1* | 1/2025 | Bensberg | G06F 16/2255 |
| 2025/0030719 | A1* | 1/2025 | Das | H04L 63/1433 |

OTHER PUBLICATIONS

Dell Technologies, "Dell PowerFlex," Specification Sheet, Mar. 2024, 16 pages.
Dell Technologies, "Dell PowerFlex 4.5.x," Technical Overview, Rev. 1.3, Jul. 2024, 71 pages.
P. O'Neil et al., "The Log-Structured Merge-Tree (LSM-Tree)," Acta Informatica, Jun. 1996, 32 pages.
C. Luo et al., "LSM-based Storage Techniques: A Survey," arXiv:1812.07527v3, Jul. 19, 2019, 25 pages.
N. Dayan et al., "Optimal Bloom Filters and Adaptive Merging for LSM-Trees," ACM Transactions on Database Systems, vol. 43, No. 4, Dec. 2018, pp. 16:1-48.

* cited by examiner

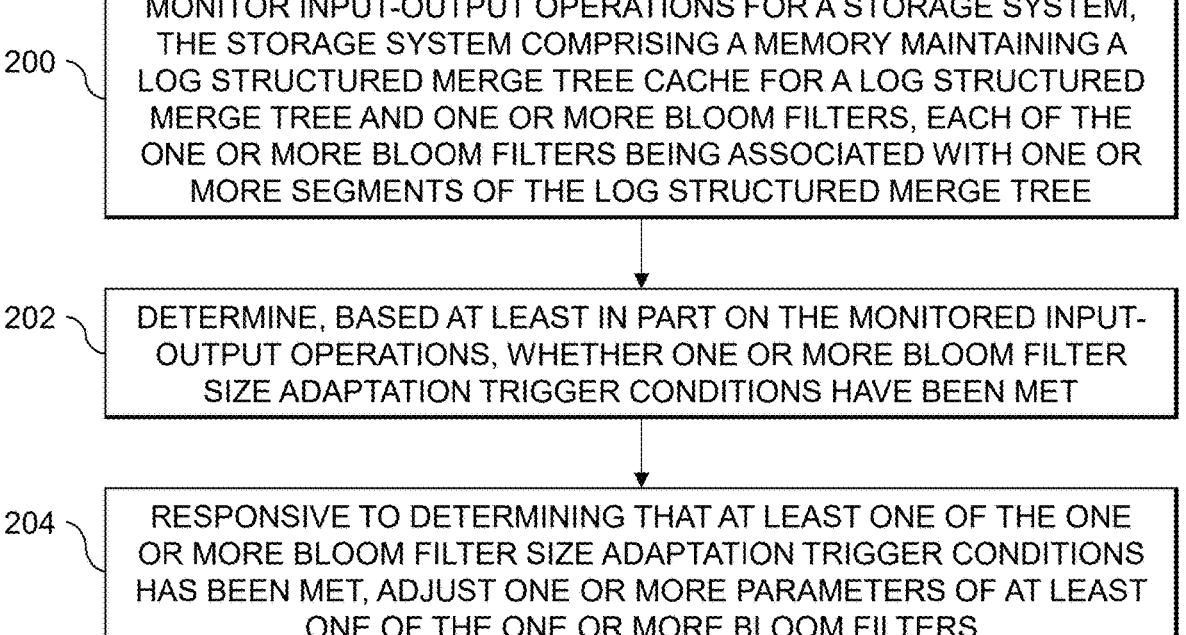

200 — MONITOR INPUT-OUTPUT OPERATIONS FOR A STORAGE SYSTEM, THE STORAGE SYSTEM COMPRISING A MEMORY MAINTAINING A LOG STRUCTURED MERGE TREE CACHE FOR A LOG STRUCTURED MERGE TREE AND ONE OR MORE BLOOM FILTERS, EACH OF THE ONE OR MORE BLOOM FILTERS BEING ASSOCIATED WITH ONE OR MORE SEGMENTS OF THE LOG STRUCTURED MERGE TREE

202 — DETERMINE, BASED AT LEAST IN PART ON THE MONITORED INPUT-OUTPUT OPERATIONS, WHETHER ONE OR MORE BLOOM FILTER SIZE ADAPTATION TRIGGER CONDITIONS HAVE BEEN MET

204 — RESPONSIVE TO DETERMINING THAT AT LEAST ONE OF THE ONE OR MORE BLOOM FILTER SIZE ADAPTATION TRIGGER CONDITIONS HAS BEEN MET, ADJUST ONE OR MORE PARAMETERS OF AT LEAST ONE OF THE ONE OR MORE BLOOM FILTERS

BLOOM FILTER (BF) SIZE PER TERABYTE (TB) AND
READ AMPLIFICATION DEPENDING ON FP RATIO

────────  TOTAL BF SIZE IN GIGABYTES (GB)

────────  MAPPER QUERY RA

────────  IO READ AMPLIFICATION

500

RANDOM-ACCESS MEMORY (RAM) SIZE DEPENDING ON LOG STRUCTURED MERGE (LSM) SIZE

FIXED PER PDS

INNERS CACHE

LEAVES CACHE

BF SIZE

DYNAMIC BLOOM FILTER ADJUSTMENT FOR STORAGE SYSTEMS IMPLEMENTING A LOG STRUCTURED MERGE TREE ARCHITECTURE

BACKGROUND

Various types of storage systems, including storage systems implementing software-defined storage (SDS) solutions, may be configured to run workloads from multiple different end-users or applications. Different end-users or applications may have different performance and feature requirements for their associated workloads. In some workloads, performance may be most important. In other workloads, capacity utilization or other feature requirements may be most important. There is thus a need for techniques which enable a storage system to offer flexibility in storage offerings for workloads with different performance and feature requirements.

SUMMARY

Illustrative embodiments of the present disclosure provide techniques for dynamic bloom filter adjustment for storage systems implementing a log structured merge tree architecture.

In one embodiment, an apparatus comprises at least one processing device comprising a processor coupled to a memory. The at least one processing device is configured to monitor input-output operations for a storage system, the storage system comprising a memory maintaining a log structured merge tree cache for a log structured merge tree and one or more bloom filters, each of the one or more bloom filters being associated with one or more segments of the log structured merge tree. The at least one processing device is also configured to determine, based at least in part on the monitored input-output operations, whether one or more bloom filter size adaptation trigger conditions have been met. The at least one processing device is further configured, responsive to determining that at least one of the one or more bloom filter size adaptation trigger conditions has been met, to adjust one or more parameters controlling a size of at least one of the one or more bloom filters.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for dynamic bloom filter adjustment for storage systems implementing a log structured merge tree architecture in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
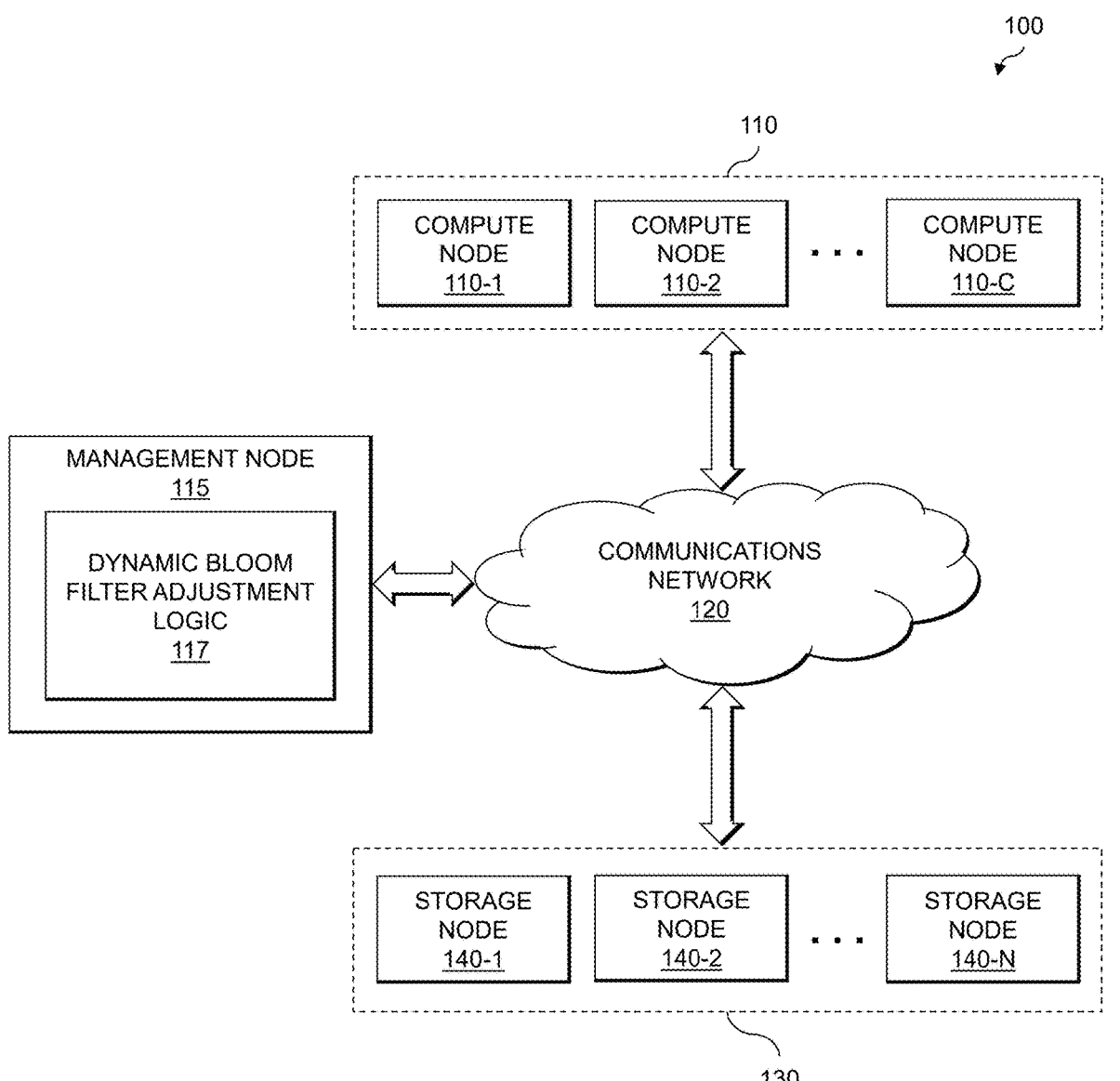
FIGS. 1A and 1B schematically illustrate an information processing system comprising a storage system configured for dynamic bloom filter adjustment in an illustrative embodiment.
Figure 1B:
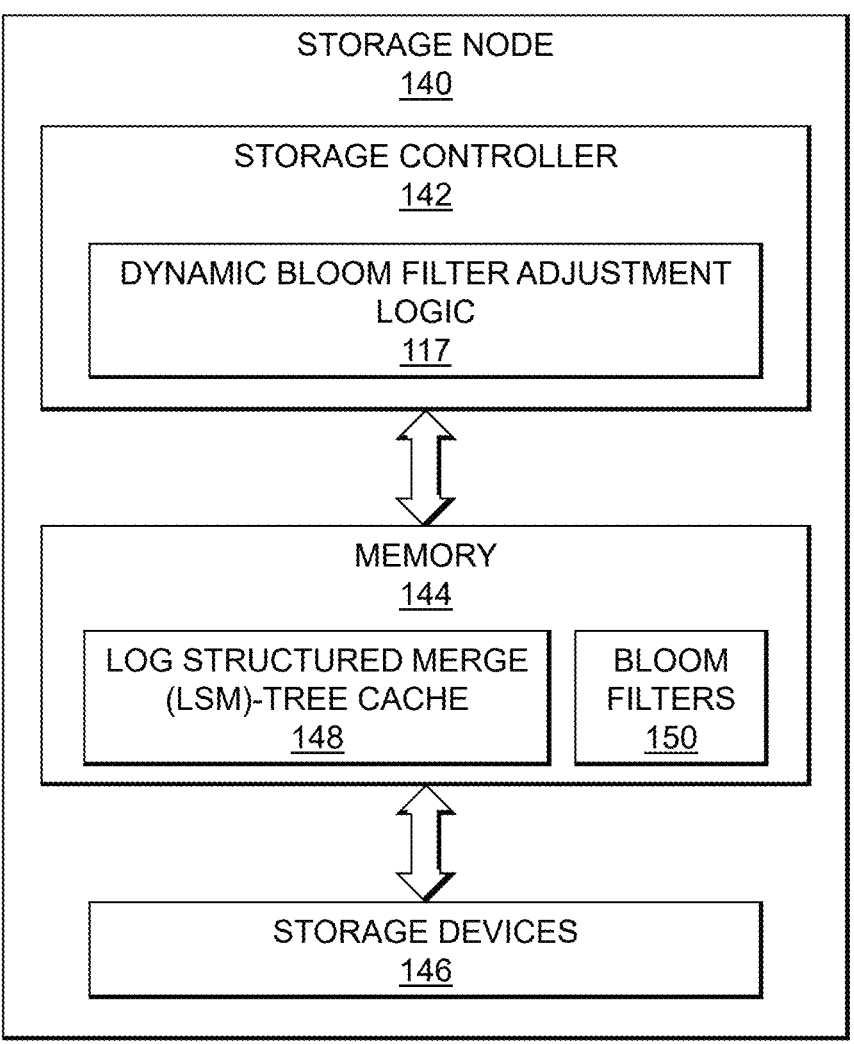

FIGS. 1A and 1B schematically illustrate an information processing system which is configured for dynamic bloom filter adjustment for a storage system implementing a log structured merge (LSM) tree architecture according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement dynamic bloom filter adjustment logic 117 supporting optimization or improvement of IO processing in the data storage system 130. FIG. 1B schematically illustrates an exemplary framework of at least one or more of the storage nodes 140.

In particular, as shown in FIG. 1B, the storage node 140 comprises a storage controller 142, a memory 144 and a plurality of storage devices 146. In general, the storage controller 142 implements data storage and management methods that are configured to divide the storage capacity of the storage devices 146 into storage pools and logical volumes. Storage controller 142 is further configured to implement dynamic bloom filter adjustment logic 117 in accordance with the disclosed embodiments, as will be described in further detail below. It is to be noted that the storage controller 142 may include additional modules and other components typically found in conventional implementations of storage controllers and storage systems, although such additional modules and other components are omitted for clarity and simplicity of illustration.

The storage node 140 is assumed to implement a log structured merge (LSM)-tree storage architecture, in which the memory 144 includes an LSM-tree cache 148 and a set of one or more bloom filters (BFs) 150. The LSM-tree cache 148 provides an in-memory data structure with a limited size providing a buffer or cache for IO write operations. The LSM-tree cache 148 has a limited size, and thus is not able to store the full LSM-tree. When the LSM-tree cache 148 is full, data may be flushed to the storage devices 146 (e.g., using any desired cache replacement algorithm). The BFs 150 are space-efficient probabilistic data structures, which may be used to check if a given storage object is in the LSM-tree cache 148. If a query to the BFs 150 returns a positive response, then the given storage object might be present in the LSM-tree cache 148 (with some configurable false positive (FP) ratio). Thus, a search in the LSM-tree cache 148 may be conducted for the given storage object. If the query to the BFs 150 returns a negative response, then the given storage object is definitely not in the LSM-tree cache 148, and the storage devices 146 may be searched directly for the given storage object (e.g., skipping a search of the LSM-tree cache 148, providing efficiency for IO read operations). The dynamic bloom filter adjustment logic 117 is configured to dynamically adjust the size of the BFs 150. This may include adjusting the FP ratio of the BFs 150 (e.g., as a lower FP ratio leads to a larger BF size). This may also or alternatively include adjusting the LSM-tree size (also referred to simply as the LSM size), as the size of the BFs 150 grows linearly with the number of entries in the LSM.

In the embodiment of FIGS. 1A and 1B, the dynamic bloom filter adjustment logic 117 may be implemented at least in part within the one or more management nodes 115 as well as in one or more of the storage nodes 140 of the data storage system 130. This may include implementing different portions of the dynamic bloom filter adjustment logic 117 functionality described herein within the management nodes 115 and the storage nodes 140. In other embodiments, however, the dynamic bloom filter adjustment logic 117 may be implemented entirely within the management nodes 115 or entirely within the storage nodes 140. In still other embodiments, at least a portion of the functionality of the dynamic bloom filter adjustment logic 117 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue IO requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCOE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such non-volatile random-access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control IO access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes

110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various functions as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (IOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternately separate devices offering the same performance level to gain performance isolation between different sets of storage volumes. For example, the storage systems may separate the "fast" devices into different groups to gain performance isolation between storage volumes on such different groups of the "fast" devices.

Illustrative embodiments provide functionality for optimizing or improving performance of storage systems which utilize LSM-based storage architectures (e.g., for LSM-based metadata updates), though adaptive BF size adjustment. The dynamic bloom filter adjustment logic 117 is configured to monitor the data storage system 130 for bloom filter adjustment trigger conditions (e.g., workload pattern changes, changes in cache miss ratio, modeling or prediction of extra reads bandwidth, periodic probes for forcing random gradual changes for learning, etc.) and, responsive to detecting such conditions, to adjust one or more parameters affecting the size of the BFs 150 (e.g., by adjusting a BF FP ratio or a size of the LSM tree).

An exemplary process for dynamic bloom filter adjustment for a storage system implementing an LSM tree architecture will now be described in more detail with reference to the flow diagram of FIG. 2. It is to be understood that this particular process is only an example, and that additional or alternative processes for dynamic bloom filter adjustment for storage systems implementing an LSM tree architecture may be used in other embodiments.

In this embodiment, the process includes steps 200 through 204. These steps are assumed to be performed using the dynamic bloom filter adjustment logic 117, which as noted above may be implemented in the management nodes 115 of system 100, in storage nodes 140 of the data storage system 130 of system 100, in compute nodes 110 of system 100, combinations thereof, etc. The process begins with step 200, monitoring IO operations for the data storage system 130, where the data storage system 130 includes the storage node 140 having the memory 144 maintaining an LSM-tree cache 148 for an LSM tree and BFs 150, where each of the BFs 150 is associated with one or more segments of the LSM tree. In step 202, a determination is made as to whether one or more BF size adaptation trigger conditions have been met based at least in part on the monitored IO operations. Responsive to determining that at least one of the one or more bloom filter size adaptation trigger conditions has been met, one or more parameters controlling a size of at least one of the one or more BFs 150 is adjusted in step 204.

Adjusting the one or more parameters in step 204 may comprise adjusting a BF FP ratio. Adjusting the BF FP ratio may comprise increasing or reducing the BF FP ratio for newly created segments of the LSM tree. The FIG. 2 process may further include determining whether to roll-back the adjustment of the BF FP ratio based at least in part on monitoring actual BF FP results and a metadata cache miss ratio following adjustment of the BF FP ratio.

Adjusting the one or more parameters in step 204 may also or alternatively include adjusting a size of the LSM tree. Adjusting the size of the LSM tree may comprise maintaining more or fewer segments on a given level (e.g., a bottom level) of the LSM tree. Adjusting the size of the LSM tree may include removing a given level (e.g., the bottom level) of the LSM tree or adding a new level (e.g., a new bottom level) of the LSM tree. The FIG. 2 process may further include determining whether to roll-back the adjustment of the size of the LSM tree based at least in part on monitoring a metadata cache miss ratio and metadata write amplification following adjustment of the size of the LSM tree.

Monitoring the IO operations for the storage system in step 200 may include classifying a current workload pattern for the storage system, the current workload pattern being classified based at least in part on monitoring a set of workload pattern characteristics of the monitored IO operations, the set of workload pattern characteristics comprises a read/write ratio, an IO size, an active data set (ADS) write size, and an ADS read size. The one or more bloom filter size adaptation trigger conditions may include determining that a classified current workload pattern for the storage system has changed from a previously classified workload pattern for at least a threshold amount of time.

Monitoring the IO operations for the storage system in step 200 may also or alternatively include determining a number of metadata page writes for a given monitoring cycle, determining a number of metadata page reads resulting from cache misses for the LSM tree cache for the given monitoring cycle, and determining a number of LSM tree reads resulting from BF FP responses for the given monitoring cycle. The one or more bloom filter size adaptation trigger conditions may include determining, based at least in part on the monitored IO operations for the storage system, that a cache miss ratio for the LSM tree cache maintained in the memory has changed by at least a threshold amount for at least a designated threshold period of time.

The one or more bloom filter size adaptation trigger conditions may include determining, based at least in part on a predicted ratio of cache hits to misses for the LSM tree cache maintained in the memory, that changing at least one of a size of the LSM tree and a FP ratio of the one or more BFs 150 is predicted to result in at least a threshold improvement in a number of metadata IO operations involving the LSM tree cache maintained in the memory.

In some embodiments, the one or more bloom filter size adaptation trigger conditions include determining that at least a threshold amount of time has elapsed since a last adjustment of the one or more parameters controlling the size of at least one of the BFs 150 (e.g., to perform periodic probes, to force some gradual change for learning, etc.).

An LSM-based architecture of storage clusters requires that segment BFs are always in memory (e.g., pinned in cache). Otherwise, cluster performance is unacceptable. The BF size (e.g., the size of memory for the BF pinned in cache) is defined by various factors, including the LSM size (e.g., the BF size grows linearly with the number of entries) and a FP ratio (e.g., a lower FP ratio requires a larger BF size). Generally, the LSM size and FP ratio are parameters which are hardcoded (e.g., LSM size is 1% of MD, the FP ratio is 0.25%). A fixed BF size (e.g., defined by a fixed LSM size and FP ratio) is generally not optimal for all clusters and all workloads, which affects the cache effective size reduction and can lead to wasted bandwidth and performance degradation. Illustrative embodiments provide technical solutions for an adaptive BF size adjustment for storage with LSM-based MD updates, which addresses these and other technical challenges of conventional approaches. The technical solutions described herein are thus able to maximize cache efficiency for a specific storage cluster and workload, by adjusting the LSM size and BF FP ratio, providing optimal storage cluster performance.

Storage clusters, such as Dell PowerFlex, apply LSM techniques to optimize MD update flows. In such systems, MD updates (e.g., MD deltas) are collected or aggregated in time-ordered contiguous LSM chunks or segments that are periodically merged or compacted to larger chunks in a next or bottom level of an LSM tree (e.g., where storage systems may commonly support 2-5 levels for the LSM tree, though other numbers of levels may be used if desired). Merges from the bottom level of the LSM tree are done to the core MD store. This technique allows for reducing MD "write amplification" by avoiding or minimizing random small updates of core MD pages. Many deltas are aggregated inside the LSM structure, and are applied to core MD pages together by a single write operation in an aggregated manner.

The more deltas that are collected in the LSM structure, the better the aggregation to the core MD is provided. From the other side, any read operation that requires some MD should potentially search for that data in all the LSM chunks (e.g., since any of them may potentially contain the relevant MD), and not just in the core MD pages. The LSM-tree was originally designed for write-intensive workloads. As increasingly more read and write workloads co-exist under an LSM-tree storage structure, read data accesses can experience high latency and low throughput because of multiple extra LSM segment reads which may be required to reconstruct up-to-date MD.

To reduce the number of LSM read operations, in-memory BFs may be maintained for LSM segments. Each MD update (e.g., key) that is added to a segment is also added to the corresponding BF. Thus, before reading or searching for a key in an LSM segment, the key is looked-up in the corresponding volatile BF. If the lookup succeeds, the corresponding segment is read. It should be noted that the key may still be missed in the LSM segment, since the BF could return a FP with some small probability that depends on the BF size.

Consider, for example, a storage system that implements a MD cache component, and which operates using a least recently used (LRU) policy for fast access to MD pages. The storage system may use multiple cache instances, and each of them may store one or more types of MD pages, such as inner pages and leaves of different mappers, such as an LMAP (e.g., a logical map for a mapping object that maps a logical address (volume+offset) to a virtual address (serial)), a VMAP (e.g., a virtual map for a mapping object that maps a virtual address to a physical address), and a SMAP (e.g., a snapshot map for a mapping object that maps a snapshot address (offset) to a list of volumes and/or snapshots related to the snapshot tree where the offset was updated), BF segments, etc. There are advantages to maintaining a common MD cache for all MD types (e.g., no partitioning and waste, uniform LRU, etc.), but also disadvantages (e.g., the efficiency of caching for different types of MD is different and may by dynamic, depending on the nature of the pages and the workload pattern). Some randomly accessed pages (e.g., page types) may cause trash eviction for periodically accessed pages (e.g., cache trashing). Also, the pinning of some "required pages" (e.g., BF pages) may reduce the effective size of the cache and make it inefficient. In other words, the negative effects of the low retention of core MD pages may exceed the positive effects of maintaining the pinned pages (e.g., BF pages).

Figure 3:
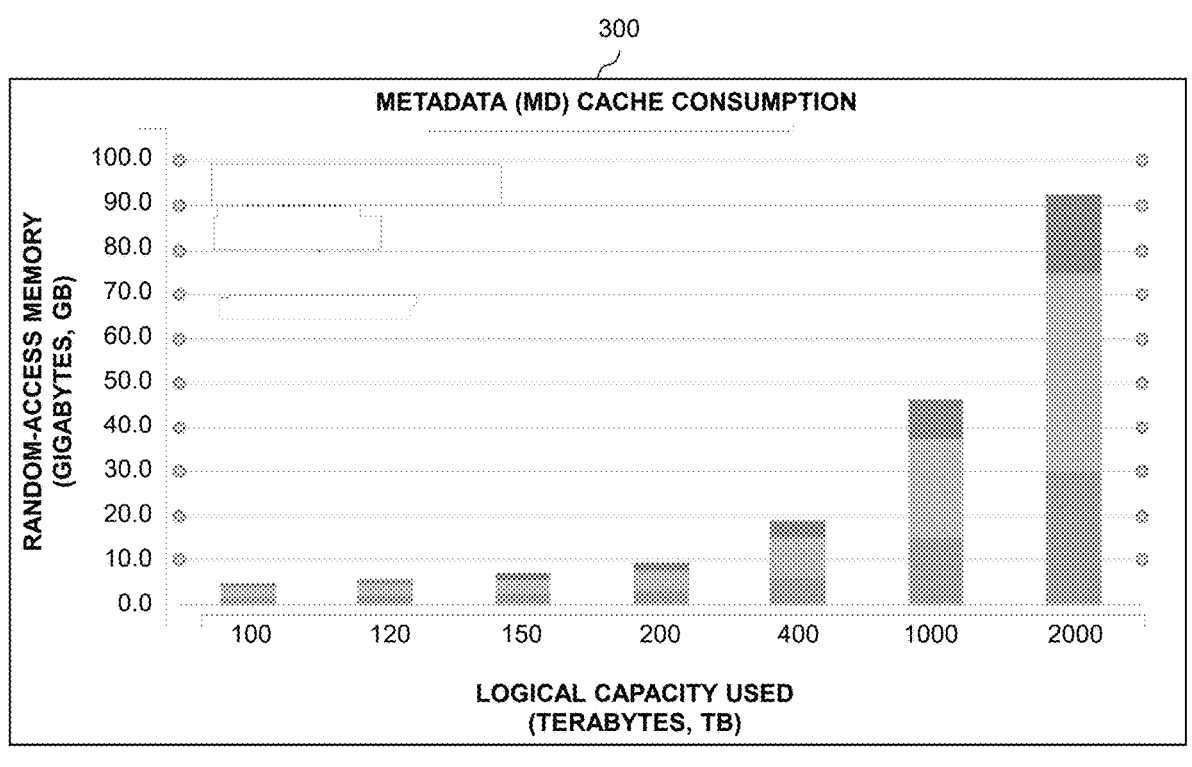
FIG. 3 shows a chart of metadata cache consumption in an illustrative embodiment.

As discussed above, an LSM-based storage architecture requires that segment BFs are always in memory (e.g., pinned in cache), otherwise cluster performance is not acceptable. The BF size (e.g., the size of the memory for the BF pinned in cache) is defined by various factors, such as the LSM size and FP ratio. In some cases, these parameters are hardcoded or static (e.g., LSM is 1% of MD, FP ratio is 0.25%). The optimal values of these parameters, however, strongly depend on the specific workload of a storage system. A higher BF FP ratio may produce less "extra reads" but at the expense of extra reads for MD resulting from caches misses for MD pages because of frequent evictions (e.g., caused by an effective cache size reduction because of pinned BF pages). A smaller LSM and smaller BF may be efficient for read-prevailing workloads, or in the case of very small write active data set (ADS), as update aggregation will be good enough. It should be noted that the active data set or ADS may be a subset of the overall data set stored in a storage system. Consider, for example, 100 terabytes (TB) of data, of which 70 TB is backups that are unlikely to be read or written to in a given time interval. In this example, the ADS is the remaining 30 TB of the data. Thus, a fixed BF size (e.g., defined by a fixed LSM size and FP ratio) is generally not optimal for all storage clusters and all specific workloads. Approaches which utilize a fixed BF size can result in cache effective size reduction, wasting device bandwidth and performance degradation. If the BF share in a MD cache is rather high (e.g., 60% or more), then the performance impact may be significant. This is illustrated in FIG. 3, which shows a plot 300 of MD cache consumption for memory (RAM) as a function of logical capacity used for a leaves cache, BFs size, and inners cache.

The technical solutions described herein provide approaches for adaptive BF size adjustment for storage with LSM-based MD updates. The technical solutions described herein are thus able to maximize cache efficiency for specific storage clusters and workloads by adjusting the LSM size and BF FP ratio, and thus dynamically adapting the cache volume used for BFs, to provide optimal or improved performance.

In some embodiments, the BF size is adapted to the actual IO workload patterns and/or performance/cost requirements for specific storage clusters. A series of performance benchmarks may be run for different IO workload patterns with different configurations (e.g., different BF FP ratios, different LSM sizes, and different cache sizes) to determine the optimal set of parameters for different workload types and configurations (e.g., the set of parameters which minimizes extra MD reads and writes). This may include a rough classification, done for a relatively small number of different workload types (e.g., 2-10 patterns). Based on defined triggers (IO pattern changes, cache metrics changes) and/or periodic adaptation cycles, the BF size is changed by updating a set of parameters (e.g., LSM size and/or FP ratio) with a target of minimizing the extra MD IOs. If the target metric is decreased, the changes are kept. Otherwise, the changes are discarded, and the system is returned to the previous state (e.g., a previous set of parameters).

The dynamic adjustment and regulation of the BF FP ratio has a regulation target of minimizing the overall number of "extra reads" caused by BF FP replies and MD page cache misses. The BF FP ratio influences the "extra reads" bandwidth in both directions. Increasing the FP ratio will directly increase the extra reads from LSM segments caused by FPs, and at the same time indirectly decrease the number of "cache miss" related extra reads since the effective size of the cache is increased. Thus, the optimal FP value is a "saddle point" that minimizes the overall "extra reads" bandwidth. This saddle point is the regulation target.

The regulation action is reducing or increasing the FP ratio for newly created segments. The FP ratio is an attribute of a segment or BF, and BFs with different FP ratio attributes are allowed inside the same LSM. Any changes to the BF ratio may be done with gradual or small steps. The regulation feedback includes determining the actual BF FPs (e.g., the extra reads per one IO for some time interval) and the MD cache miss ratio (e.g., the cache misses per one IO for some time interval). The regulation action triggers include: determining that an IO pattern has changed for some threshold length of time (e.g., several hours, a day, etc.) and, according to a data structure mapping IO patterns to BF FP ratios (e.g., which may be created using experimental data as discussed above), another FP ratio is optimal for the new IO pattern; determining that the monitored "cache miss" ratio is essentially different when the actual BF size is (randomly) jumping in a natural way (e.g., start or finish of a merge to core cycle), where in some cases the cache size may be changed or increased intentionally to make a probe; modeling or prediction of extra reads bandwidth shows that improvement in the extra reads bandwidth may be achieved if the FP ratio of BFs is changed, where the prediction is based on the cache hit/miss ratio prediction as discussed in further detail below; and performing optional periodic probes, where if no adaptation cycle was started during the last predefined time duration, some random gradual change or learning is forced, which may impact performance (e.g., cause artificial hiccups) and thus may be avoided or not applied in sensitive environments.

In some embodiments, the LSM size is also dynamically adjusted or regulated, with the regulation target being minimization of the overall number of IOs caused by MD page cache misses (e.g., for read IOs) and MD write amplification (e.g., the number of IO writes required for final settling of MD updates). It is noted that the LSM size has an influence on IO bandwidth in both directions. Increasing the LSM size generally increases the number of MD IO reads caused by cache misses (e.g., as a larger LSM leads to larger BFs, leading to a smaller cache for MD pages and more cache misses), while at the same time decreasing the number of MD IO writes (e.g., as a larger LSM leads to higher MD updates aggregation and amortization). Thus, the optimal LSM size is a saddle point that minimizes the overall IO bandwidth, accounting for both MD IO reads and MD IO writes. Unlike the FP regulation, the regulation of the LSM size has a read versus write tradeoff. Thus, SSD or other storage device endurance considerations are taken into account. Providing acceptable endurance may be the highest priority, so any LSM size regulation may be done only if SSD or other storage device endurance targets allow it. This breaks the assumption that the desired or targeted LSM size is a linear function from the core MD size.

The regulation action for dynamically adjusting the LSM size includes reducing or increasing the LSM size, by allowing or maintaining less or more segments on the bottom level (e.g., with a granularity of one segment), removing or adding a bottom level in the edge case. The regulation feedback is the MD cache miss ratio (e.g., cache misses per one IO for some designated time interval) and the MD write amplification (e.g., the overall number of MD IO writes for some designated time interval). The regulation action triggers include, for example: determining that the IO pattern has essentially changed for at least a threshold length of time (e.g., several hours, one day, etc.) and, according to a data structure mapping IO patterns to LSM sizes (e.g., which may be created using experimental data as discussed above), another LSM size is optimal for the new or changed IO pattern; determining that the monitored cache miss ratio is essentially different when the actual BF size is (randomly) jumping by a natural way (e.g., the start or finish of a merge to core cycle), where in some cases the cache size may be changed or increased intentionally to make a probe; and modelling or prediction of the extra reads bandwidth shows that an improvement is possible if the LSM size is changed, where this prediction may be based on the cache hit/miss ratio prediction described in further detail below.

In some embodiments, each adaptation cycle involves a single FP ratio or LSM size adjustment, but not both. The particular "regulation" or dynamic adaptation techniques may be applied to all mappers, or to any set of mappers. Further, each mapper or set of mappers may use a separate adjustment policy if desired.

To implement the dynamic adjustment of the BF FP ratio and the LSM size, various parameters or metrics may be monitored. Thus, in some embodiments, a set of parameters or metrics may be persistently or continuously monitored, including: IO workload pattern characteristics (e.g., for classifying IO workload patterns), such as read/write ratio, IO sizes, ADS write size, ADS read size, etc.; number of MD page writes; number of MD page reads (e.g., resulting from cache misses); the number of LSM reads (e.g., resulting from BF FP responses); and a set of metrics that allow for estimating or predicting cache efficiency and its behavior depending on cache size, as discussed in further detail below. These parameters and metrics are collected and determined once per monitoring cycle, where the monitoring cycle should be long enough to include asynchronous background activity. In some embodiments, the monitoring interval is several hours to a day or more (e.g., like the application periodicity interval). The total numbers for the parameters and metrics may be normalized as per the front end (FE) IOs ingested at the same interval, such that parameters or metrics like the "number of MD writes per N FE IOs" may be maintained. This enables the technical solutions described herein to take into account all the hidden or postponed costs triggered by the FE IOs. Once the set of parameters or metrics is determined, it is deemed to be valid and constant until completion of the next monitoring cycle.

For the dynamic adaptation of the BF FP ratio and LSM size, the adaptation or change cycle is higher than the monitoring cycle. Changes in the BF FP ratio and LSM size are applied (e.g., actually changing the BF size in cache) just after several merge cycles. Thus, the next change (or rollback of a previous change) may be done just after at least one full monitoring cycle that takes place when the new BF size is implemented or completed. This allows for understanding the real impact of changes, and making the next decisions based on the real impacts of the changes. Also, this allows the technical solutions in some embodiments to be conservative and safe (e.g., with gradual changes and long monitoring cycles). This is advantageous, as the target is not necessarily fine-tuning for each "hiccup" in the data, but rather to adapt for the general application patterns and use cases. The decisions about changes are done on each adaptation cycle (e.g., which may be several hours to a day or more). The corresponding change triggers are analyzed, and it is expected that in the majority of cases the decision will be to do nothing (e.g., make no change to the BF FP ratio or the LSM size). In some cases, which are expected to be relatively rare (e.g., when IO patterns or workloads have dramatically changed, or when an initial learning probe is begun), changes to the BF FP ratio and/or LSM size are triggered.

Figure 4:
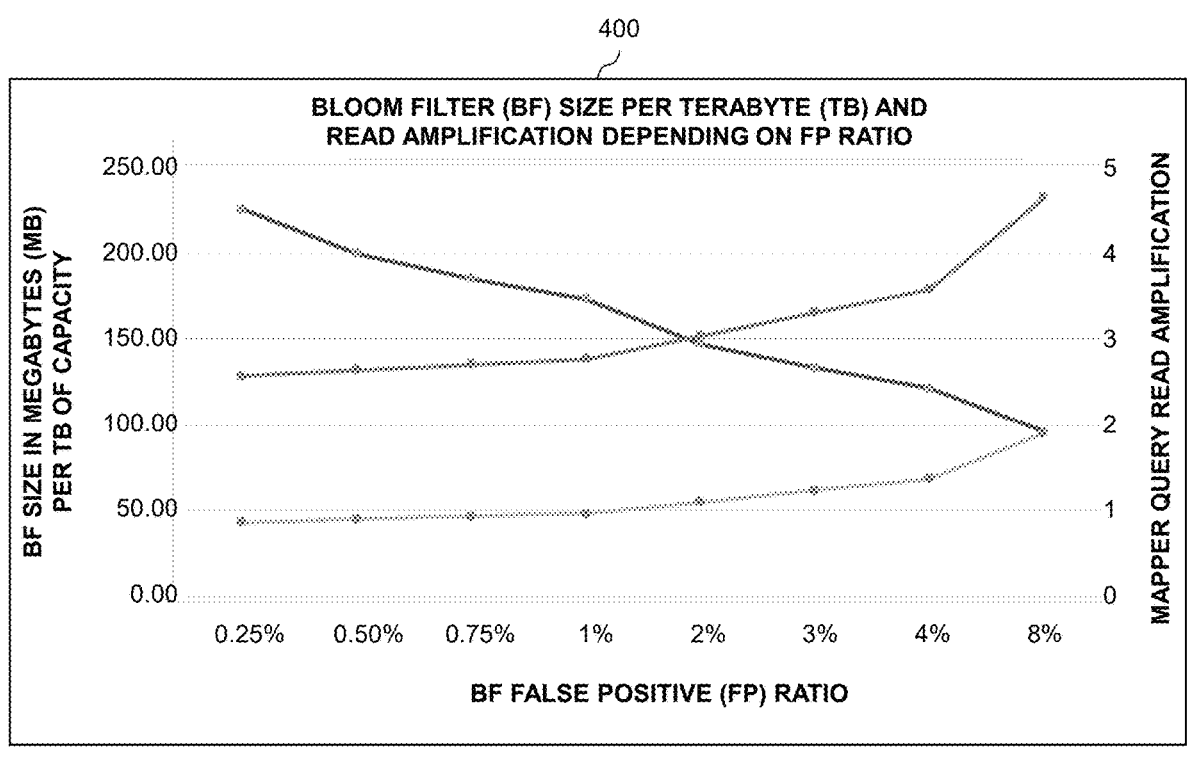
FIG. 4 shows a plot of bloom filter size and read amplification as a function of bloom filter size and bloom filter false positive ratio in an illustrative embodiment.

The BF FP ratio regulation or dynamic adaptation may be based on mathematically estimating the extra reads which will be caused by changing the FP ratio, as modeled in the plot 400 of FIG. 4, which shows the BF size per TB and the read amplification depending on the FP ratio. This estimation may be done just for one specific query, and it is not known how many queries there are or will be done per FE IO, including BG-initiated and other hidden/postponed activity. Thus, it may be preferred to rely on actual internal counters. Unlike the above, cache miss changes caused by changing the BF FP ratio (and the effective cache size change) are difficult to predict, as illustrated in the chart 500 of FIG. 5. Thus, triggering by cache miss prediction is not very reliable, and the technical solutions described herein may thus be prepared for the case where the actual effect of changes is different than expected or modeled, such that changes are rolled back. Even in such cases, however, the negative impact should be limited due to the gradual nature of the BF FP ratio change. When the decision is made to change the BF FP ratio, all new BFs are created with the new FP ratio. Also, the FP ratio becomes a persistent attribute of the BF and segment.

Figure 5:
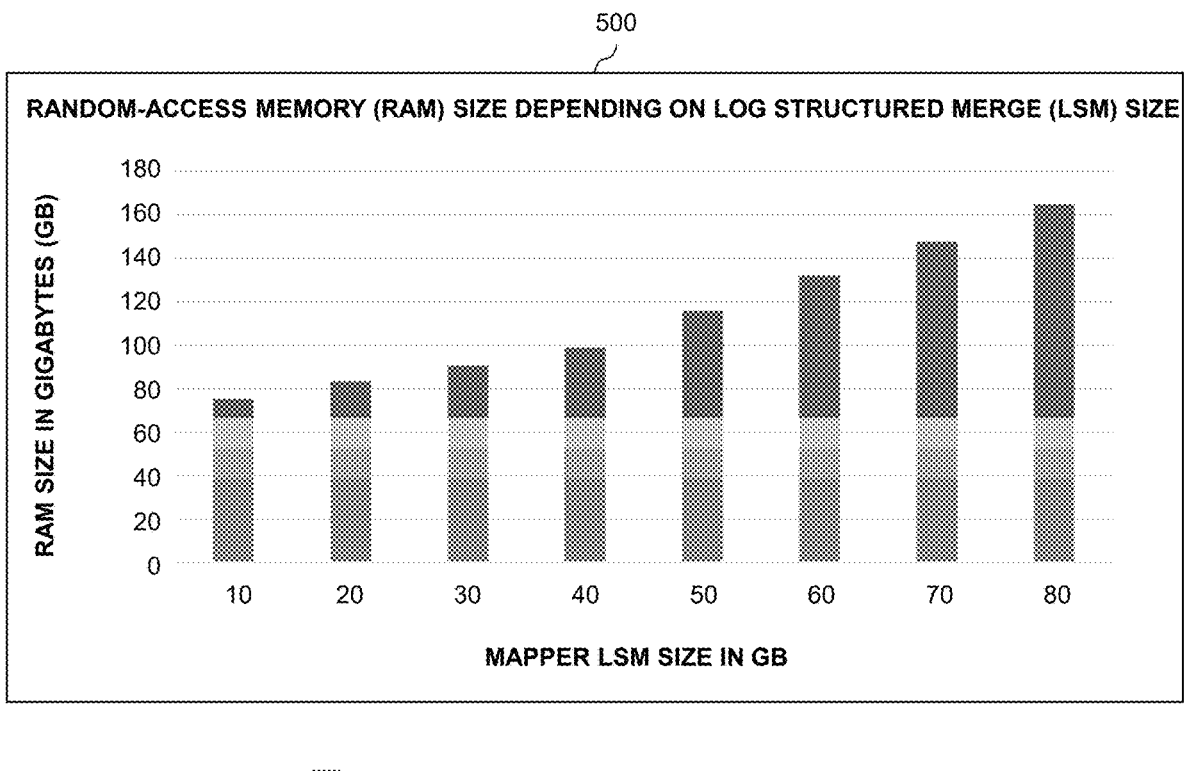
FIG. 5 shows a chart of memory size as a function of log structure merge size in an illustrative embodiment.

The LSM size regulation or dynamic adaptation has various characteristics, including that the BF size depends on the LSM size (e.g., linearly, as depicted in the chart 500 of FIG. 5). The positive effect of LSM size reduction is "cache miss"-related IO read reduction. As for the negative effect (e.g., write amplification) increase, this can generally be estimated based on the current write ADS metric. Still, the reliability of this estimation is moderate. The potential negative impact (e.g., of a wrong estimation) is also relatively low. Thus, a certain initial learning or probing may be valuable. The LSM size change itself may be implemented or done with segment granularity. Merge policy may be adjusted to provide the required number of segments on the bottom level of the LSM tree.

Incremental implementation or phasing will now be described. A static initial adjustment setting of (e.g., lifetime) BF FP ratio and LSM size may be based on a series of benchmarks and the expected workload type. The implementation of the dynamic change of the BF FP ratio and the LSM size may be based on determining that the workload patterns have essentially changed (e.g., from one IO workload pattern to another for at least some designated threshold period of time). The selection of the new BF FP ratio and/or LSM size (e.g., for the "new" workload pattern) may be chosen from a built-in table or other data structure, where this data structure is generated as a result of a series of performance benchmarks for different configurations and workload types. The dynamic adjustment may be based on mathematical predictions of the overall IO bandwidth in the case of BF FP ratio and/or LSM size changes.

Cache efficiency estimation and prediction will now be described. Metrics such as "hit ratio" may be used to analyze how a cache is performing, by calculating the number of cache hits (e.g., where a requested page was found in the cache) divided by the total number of requests. This metric, however, is very general and may fail to detect cache inefficiencies resulting in poor system resource utilization and degraded system performance. Consider, for example, a scenario where all the requests to the cache are for only 5 pages, out of 20,000 pages total which are stored in the cache. In this case, the hit ratio will be equal to 1, hiding the memory inefficiency (e.g., as a significant memory portion could be freed up from the cache, to be used by other cache instances or different system components while getting the same performance and hit ratio of 1). Consider, as another example, a scenario where a mapper has leave pages which consume a large portion of the cache (e.g., 80%), but the hit rate for this specific type is 0. This is another example of an inefficiency that is not visible through the hit ratio metric. If this could be detected, the type could be removed completely from the cache to increase the hit rate of other types and thereby improve system performance. Thus, simple metrics such as hit ratio cannot alone provide an accurate understanding of whether the cache size is optimal in various scenarios including: whether the cache size may be decreased significantly (e.g., in half) without visible performance impact;

whether increasing the cache size even minimally (e.g., by just 5%) may improve the hit rate and performance dramatically; etc.

In some embodiments, a set of metrics are defined and used to provide an in-depth insight on cache performance and which allow real-time cache efficiency analysis. These metrics alone, however, while providing significant hints still do not allow for making deterministic calculations and decisions about the optimal cache sizes in the general case. The following metrics and counters may be maintained for every type stored in a cache: hits_per_retention_time, which is a histogram gathering the distribution of the number of page hits during the page retention time (e.g., during the time the page was in the cache); hit_interval, which is a histogram gathering the time interval between hits distribution for a given type; retention_time, which is a histogram gathering the lifetime duration of pages for a given type (e.g., measured from the time the page was inserted to the cache, until the page is removed from the cache); number_of_pages_in_cache, which is a counter indicating the number of pages of this type that are inside the cache; total_request_count, which a counter indicating the total number of requests for pages of a given type (e.g., resulting either with a page hit or page miss); hit_count, which is a counter indicating the total number of requests for pages of a given type that were found in the cache; retention_time_utilization, which is a histogram gathering the distribution of the period in which a page got hits, divided by the retention time (e.g., page_last_hit_time-page_insert_time/page_retention_time), which indicates the actual utilization of the retention time for page hits; and number_of_pages_removed, which is a counter that measures the number of pages removed (e.g., by LRU or another cache replacement algorithm) from the cache.

Various insights may be derived based on the above metrics. For example, when the hits_per_retention_time histogram for a specific type is all zeros while its number_of_pages_in_cache is greater than 0, this means that pages of this type consume cache memory but the access pattern isn't suitable for this type to be cached. In this case, the removal of this type from the cache should be considered. When a page is removed from the cache, its last hit timestamp (e.g., last_hit_timestamp) may be inspected and compared to the retention_time histogram. In cases where the retention time is significantly longer than the last hit time, it may be concluded that the page had a burst of hits (e.g., all hits for the page happened during a relatively short duration after the page was inserted to the cache, and then the page remained in the cache for a long time without any hit). In this case, if the scenario is repeated for most pages, it may be advantageous to reduce the cache size without affecting the cache performance. When the metrics show that the value of hit_interval×hits_count in most cases is close to the retention time, this means that pages are often removed from the cache during their hit period. This scenario indicates that increasing the cache size may improve the cache performance. Various other examples are possible.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Figure 6:
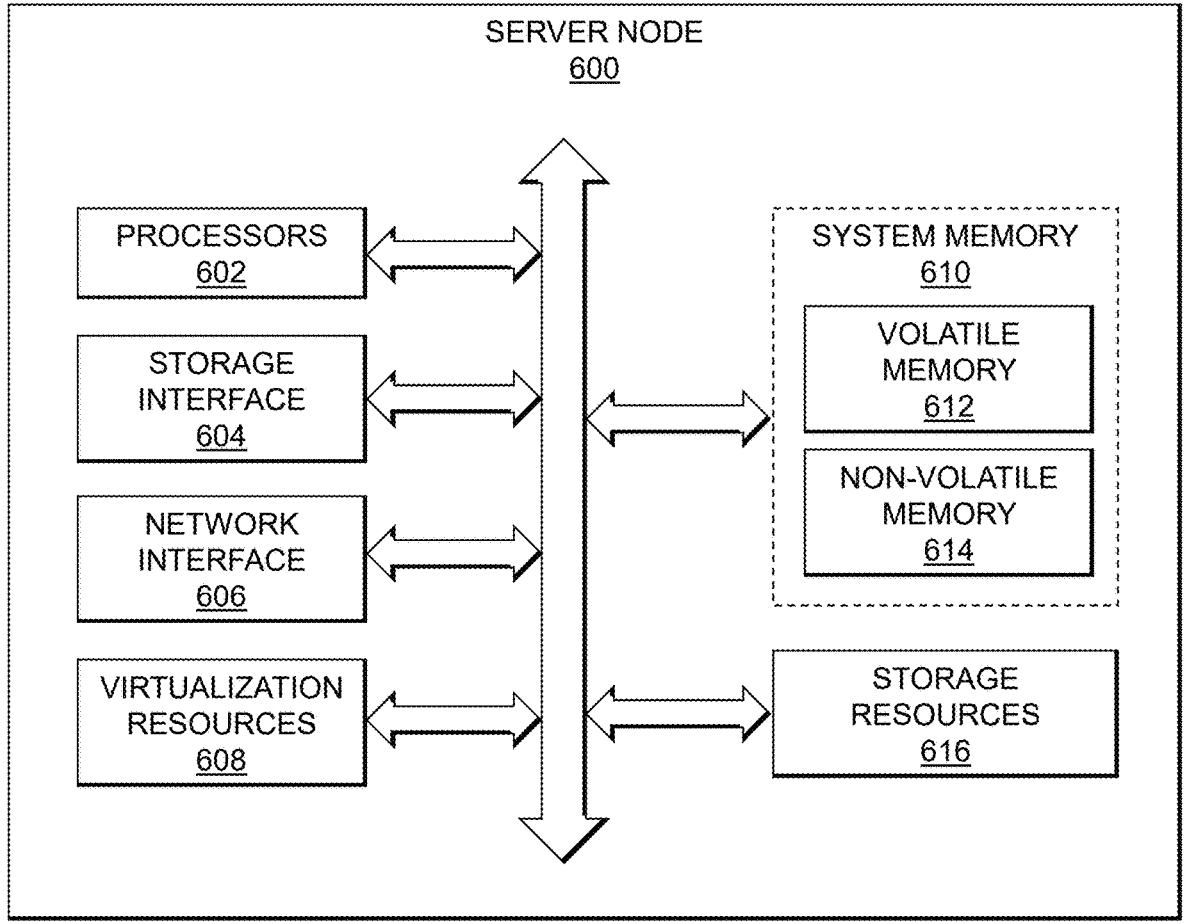
FIG. 6 schematically illustrates a framework of a server node for implementing a storage node which hosts logic for dynamic bloom filter adjustment in an illustrative embodiment.

FIG. 6 schematically illustrates a framework of a server node (or more generally, a computing node) for hosting logic for dynamic bloom filter adjustment according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the dynamic bloom filter adjustment logic 117, comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors

602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to monitor input-output operations for a storage system, the storage system comprising a memory maintaining (i) a log structured merge tree cache for a log structured merge tree and (ii) a first set of one or more bloom filters, the log structured merge tree comprising a plurality of segments, each of the first set of one or more bloom filters being associated with a subset of the plurality of segments of the log structured merge tree, each bloom filter of the first set of one or more bloom filters having one or more parameters selected based at least in part on a workload pattern of the storage system determined in conjunction with addition of a given subset of the plurality of segments, associated with at least one bloom filter of the first set of one or more bloom filters, to the log structured merge tree;

to determine, based at least in part on the monitored input-output operations, whether at least one of one or more bloom filter size adaptation trigger conditions have been met, the one or more bloom filter size adaptation trigger conditions comprising determining a current workload pattern of the storage system, the current workload pattern being determined based at least in part on monitoring a set of workload pattern characteristics of the monitored input-output operations; and responsive to determining that at least one of the one or more bloom filter size adaptation trigger conditions has been met, to adjust one or more parameters of a second set of one or more bloom filters maintained in the memory, the second set of one or more bloom filters being associated with one or more additional subsets of segments added to the log structured merge tree;

wherein the second set of one or more bloom filters is different than the first set of one or more bloom filters; and wherein the one or more parameters of the first and second sets of one or more bloom filters comprise at least one bloom filter false positive ratio.

2. The apparatus of claim 1 wherein adjusting the one or more parameters of the second set of one or more bloom filters comprises adjusting the bloom filter false positive ratio.

3. The apparatus of claim 2 wherein adjusting the bloom filter false positive ratio comprises increasing or reducing the bloom filter false positive ratio for the second set of one or more bloom filters.

4. The apparatus of claim 2 wherein the at least one processing device is further configured to determine whether to roll-back the adjustment of the bloom filter false positive ratio based at least in part on monitoring actual bloom filter false positive results and a metadata cache miss ratio following adjustment of the bloom filter false positive ratio.

5. The apparatus of claim 1 wherein the at least one processing device is further configured, responsive to determining that at least one of the one or more bloom filter size adaptation trigger conditions has been met, to adjust a size of the log structured merge tree maintained in the memory.

6. The apparatus of claim 5 wherein adjusting the size of the log structured merge tree comprises maintaining more or fewer segments on a given level of the log structured merge tree.

7. The apparatus of claim 5 wherein adjusting the size of the log structured merge tree comprises one of:
   removing a given level of the log structured merge tree; and
   adding a new level of the log structured merge tree.

8. The apparatus of claim 5 wherein the at least one processing device is further configured to determine whether to roll-back the adjustment of the size of the log structured merge tree based at least in part on monitoring a metadata cache miss ratio and metadata write amplification following adjustment of the size of the log structured merge tree.

9. The apparatus of claim 1 wherein the set of workload pattern characteristics comprises a read/write ratio, an input-output size, an active data set write size, and an active data set read size.

10. The apparatus of claim 1 wherein the one or more bloom filter size adaptation trigger conditions comprises determining that the current workload pattern of the storage system has changed from a previously classified workload pattern of the storage system for at least a threshold amount of time, the previously classified workload pattern being determined when at least one of the first set of one or more bloom filters were created.

11. The apparatus of claim 1 wherein monitoring the input-output operations for the storage system comprises determining a number of metadata page writes for a given monitoring cycle, determining a number of metadata page reads resulting from cache misses for the log structured merge tree cache for the given monitoring cycle, and determining a number of log structured merge tree reads resulting from bloom filter false positive responses for the given monitoring cycle.

12. The apparatus of claim 1 wherein the one or more bloom filter size adaptation trigger conditions comprise determining, based at least in part on the monitored input-output operations for the storage system, that a cache miss ratio for the log structured merge tree cache maintained in the memory has changed by at least a threshold amount for at least a designated threshold period of time.

13. The apparatus of claim 1 wherein the one or more bloom filter size adaptation trigger conditions comprise determining, based at least in part on a predicted ratio of cache hits to misses for the log structured merge tree cache maintained in the memory, that changing at least one of a size of the log structured merge tree and a false positive ratio of one or more bloom filters is predicted to result in at least a threshold improvement in a number of metadata input-output operations involving the log structured merge tree cache maintained in the memory.

14. The apparatus of claim 1 wherein the one or more bloom filter size adaptation trigger conditions comprise determining that at least a threshold amount of time has elapsed since a previous adjustment of the one or more parameters.

15. A computer program product comprising a non-transitory processor-readable storage medium having stored therein program code of one or more software programs, wherein the program code when executed by at least one processing device causes the at least one processing device:
   to monitor input-output operations for a storage system, the storage system comprising a memory maintaining (i) a log structured merge tree cache for a log structured merge tree and (ii) a first set of one or more bloom filters, the log structured merge tree comprising a plurality of segments, each of the first set of one or more bloom filters being associated with a subset of the plurality of segments of the log structured merge tree, each bloom filter of the first set of one or more bloom filters having one or more parameters selected based at least in part on a workload pattern of the storage system determined in conjunction with addition of a given subset of the plurality of segments, associated with at least one bloom filter of the first set of one or more bloom filters, to the log structured merge tree;
   to determine, based at least in part on the monitored input-output operations, whether at least one of one or more bloom filter size adaptation trigger conditions have been met, the one or more bloom filter size adaptation trigger conditions comprising determining a current workload pattern of the storage system, the current workload pattern being determined based at least in part on monitoring a set of workload pattern characteristics of the monitored input-output operations; and
   responsive to determining that at least one of the one or more bloom filter size adaptation trigger conditions has been met, to adjust one or more parameters of a second set of one or more bloom filters maintained in the memory, the second set of one or more bloom filters being associated with one or more additional subsets of segments added to the log structured merge tree;
   wherein the second set of one or more bloom filters is different than the first set of one or more bloom filters; and
   wherein the one or more parameters of the first and second sets of one or more bloom filters comprise at least one bloom filter false positive ratio.

16. The computer program product of claim 15 wherein adjusting the one or more parameters of the second set of one or more bloom filters comprises adjusting the bloom filter false positive ratio.

17. The computer program product of claim 15 wherein the program code when executed by the at least one processing device further causes the at least one processing device, responsive to determining that at least one of the one or more bloom filter size adaptation trigger conditions has been met, to adjust a size of the log structured merge tree.

18. A method comprising:
   monitoring input-output operations for a storage system, the storage system comprising a memory maintaining (i) a log structured merge tree cache for a log structured merge tree and (ii) a first set of one or more bloom filters, the log structured merge tree comprising a plurality of segments, each of the first set of one or more bloom filters being associated with a subset of the plurality of segments of the log structured merge tree, each bloom filter of the first set of one or more bloom filters having one or more parameters selected based at least in part on a workload pattern of the storage system determined in conjunction with addition of a given subset of the plurality of segments, associated with at least one bloom filter of the first set of one or more bloom filters, to the log structured merge tree;

determining, based at least in part on the monitored input-output operations, whether at least one of one or more bloom filter size adaptation trigger conditions have been met, the one or more bloom filter size adaptation trigger conditions comprising determining a current workload pattern of the storage system, the current workload pattern being determined based at least in part on monitoring a set of workload pattern characteristics of the monitored input-output operations; and responsive to determining that at least one of the one or more bloom filter size adaptation trigger conditions has been met, adjusting one or more parameters of a second set of one or more bloom filters maintained in the memory, the second set of one or more bloom filters being associated with one or more additional subsets of segments added to the log structured merge tree;

wherein the second set of one or more bloom filters is different than the first set of one or more bloom filters;

wherein the one or more parameters of the first and second sets of one or more bloom filters comprise at least one bloom filter false positive ratio; and wherein the method is performed by at least one processing device comprising a processor coupled to a memory.

19. The method of claim 18 wherein adjusting the one or more parameters of the second set of one or more bloom filters comprises adjusting the bloom filter false positive ratio.

20. The method of claim 18 further comprising, responsive to determining that at least one of the one or more bloom filter size adaptation trigger conditions has been met, adjusting a size of the log structured merge tree.

\* \* \* \* \*